c

US 6,722,685 B2

(12) United States Patent
Koch et al.

(10) Patent No.: US 6,722,685 B2
(45) Date of Patent: Apr. 20, 2004

(54) JOINT BETWEEN TWO VEHICLES OR VEHICLE PARTS

(75) Inventors: Robert Koch, Bad Sooden Allendorf (DE); Jens Karasek, Kaufungen (DE); Horst Joachim Gumpert, Salzgitter (DE)

(73) Assignee: Hubner GmbH, Kassel (DE)

( * ) Notice: Subject to any disclaimer, the term of this patent is extended or adjusted under 35 U.S.C. 154(b) by 14 days.

(21) Appl. No.: 10/092,818

(22) Filed: Mar. 7, 2002

(65) Prior Publication Data

US 2002/0140204 A1 Oct. 3, 2002

(30) Foreign Application Priority Data

Mar. 29, 2001 (DE) .......................... 101 15 767
Jan. 25, 2002 (EP) ............................. 02001780
Jan. 29, 2002 (EP) ............................. 02002159

(51) Int. Cl.[7] .............................................. B62D 53/00
(52) U.S. Cl. ...................... 280/499; 280/492; 280/494

(58) Field of Search ............................... 280/400, 456.1, 280/460.1, 461.1, 492, 494, 499

(56) References Cited

U.S. PATENT DOCUMENTS

| 4,241,270 A | * | 12/1980 | Haydon et al. ............. 310/164 |
| 4,405,143 A | * | 9/1983 | Rosenkrands ............... 280/403 |
| 4,421,339 A | * | 12/1983 | Hagin ..................... 280/460.1 |
| 5,052,707 A | * | 10/1991 | Timan ....................... 280/403 |

* cited by examiner

Primary Examiner—Lesley D. Morris
Assistant Examiner—L. Lum
(74) Attorney, Agent, or Firm—Thomas R. Vigil; Welsh & Katz, Ltd.

(57) ABSTRACT

The joint between two vehicles or vehicle parts, such as an articulated bus or a railcar for example, comprises at least two joint members (11, 12; 11a, 21a; 111a, 112a) that are held apart from a central longitudinal axis (50) of the vehicle (2, 3; 102, 103) and with at least one, preferably two joint arms (12a, 12, 22; 113, 114) that is/are carried so as to be capable of rotating about the two joint members.

29 Claims, 15 Drawing Sheets

JOINT BETWEEN TWO VEHICLES OR VEHICLE PARTS

CROSS-REFERENCE TO RELATED APPLICATIONS

This application claims priority from German Application No. 101 15 767.3-21 filed Mar. 29, 2001, from European Patent Application No. 02001780.2 filed on Jan. 25, 2002 and from European Patent Application 02002159.8 filed on Jan. 29, 2002.

BACKGROUND OF THE INVENTION

1. Field of the Invention

The invention relates to a joint between two vehicles or vehicle parts such as an articulated bus or a railcar for example.

2. Description of the Prior Art

Joints between two vehicles or vehicle parts, in an articulated bus for example, are notoriously well known. A central joint in the form of a buckle joint is thereby provided, its central axle being arranged in the central longitudinal axis of the vehicle. The vehicle buckles about this axle when threading a curve.

The shortcoming of the known buckle joints is that the two vehicles or vehicle parts need to be separated by a distance of approximately 1,600 mm on account of the extension of the joint. As the space the joint occupies between the two vehicles or vehicle parts is in principle of limited use only, there is an interest in minimizing the distance between the two vehicles or vehicle parts in order to possibly accommodate another row of seats in the vehicles or vehicle parts.

BRIEF SUMMARY OF THE INVENTION

The object of the invention is therefore to provide a joint, more specifically a buckle joint, that permits to reduce the distance between the two vehicles or vehicle parts that are joined together by way of said joint as compared to a conventional buckle joint.

To achieve this object and in accordance with the purpose of the invention, a first variant suggests to provide the joint with at least two joint members that are held apart from the central longitudinal axis of the vehicle and with at least one, preferably two joint arms that is/are carried so as to be capable of rotating about the two joint members. In the simplest case i.e., in an embodiment with two joint members and one joint arm, the joint arm, depending on the direction of the curve, alternatively rotates about the axle of the one or of the other joint member in a way similar to that of a swinging door. It has thereby to be made certain that the respective one of the joint members that is not in operation is fixed.

In dividing a central buckle joint into two joint members which have one pivot each and are located outside the central longitudinal axis of the vehicle i.e., to the side of the vehicle, the distance between the two vehicles or vehicle parts in the region of the joint is reduced. More specifically, the distance of heretofore 1,600 mm may be reduced to less than 1,100 mm, so that another row of seats may be arranged in one of the vehicles or vehicle parts. Another advantage is that the bellows may be shortened to about half its length due to the reduced distance between the vehicles, which is particularly advantageous with regard to cost since the central frame that serves as a stabilizing element may be dispensed with. Another advantage is that the change in the kinematics that was occasioned by the division into two joint members causes the bellows to be only slightly displaced transversely, which results in an improved durability of the bellows. From a constructional point of view, splitting the prior art central buckle joint into two joint members that are held apart from the central longitudinal axis of the vehicle causes the one or the other joint to be activated depending on the curve the vehicle has to thread. By virtue of the reduced length when traveling around a curve, the bellows bulges less, more particularly downward, because it may be of a more rigid configuration as it is only slightly displaced transversely. Inasmuch, busses with little road clearance (low-platform busses) may also be built with such a joint or bellows.

Further advantageous embodiments and features of this variant will become apparent in the subordinate claims.

In a first embodiment with two joint arms, it is for example particularly advantageous that each vehicle or vehicle part be provided with a bearing bracket, each of the bearing brackets receiving a joint arm. Said joint arm is thereby rotatably connected to the bearing bracket. To attach the joint to the vehicle by means of bearing brackets has the advantage that the joint may be inserted between the two vehicles or vehicle parts as an entity so to speak.

Furthermore, the bearing brackets are advantageously flush on the vehicles or vehicle parts i.e., they are arranged on the same height in an effort to prevent vertical moments from being brought into the vehicles or vehicle parts.

To minimize the height of the joint as a whole, the two joint arms are arranged, according to another feature, above and beneath the corresponding bearing bracket.

To prevent the joint from not being activated when the vehicle is traveling in a straight line, the two joint arms are non-rotatably linked to the corresponding bearing bracket in the joint member in the region of their respective pivot. This also means that, when threading a curve, the corresponding joint arms are alternatively rotatably linked to the one or to the other bearing bracket, stopping or locking of the respective one of the joint members depending on the curve that has to be threaded. More specifically and to prevent rotation, at least one bolt is provided for connecting at least one joint member to the respective one of the bearing brackets.

As the two joint arms are joined together, the bolt must take hold of both the one and the other joint member in order to fixate the one joint in such a manner that it cannot rotate.

According to another advantageous feature, the one bearing bracket may be linked to the vehicle or vehicle part in such a manner as to be vertically pivotal which permits the vehicle to travel through depressions or drive over hilltops.

According to a second and third embodiment, the solution in accordance with the invention is that the joint members that are held apart from the central longitudinal axis of the vehicle may be slidably received by the one vehicle or vehicle part across the central longitudinal axis of the vehicle, the two joint arms being connected by their other end to the other vehicle or vehicle part by means of a swivel joint that is arranged in the central longitudinal axis of the vehicle. This clearly shows that the buckling movement is performed in two stages. On the one hand the connection of the joint members to the other vehicle or vehicle part by means of a swivel joint arranged in the central longitudinal axis permits a certain buckling angle, preferably a buckling angle of up to 15°. If the buckling angle needs to be higher, which is for example the case when such a bus must travel around sharp curves, one of the joint members is displaced across the central longitudinal axis of the vehicle, thus enlarging the buckling angle. For, depending on the curve that is threaded, the one joint member, with a vertically oriented axle for example, that holds the one joint arm is caused to move toward the other joint member with the other joint arm. The joint arm hereby oscillates about the corresponding joint member. This means that the distance between the two vehicles or vehicle parts increases on the outer side of the curve, the extent of the increase of said distance between the two vehicles or vehicle parts being dimensioned in function of the capability of the joint member that holds the joint arm of moving toward the other joint arm. How much the distance between the two vehicles or vehicle parts increases additionally depends on the length of the joint arms.

This buckling in two stages bases on the finding that in 90% of the driving time of an articulated bus the maximum buckling angle to be realized is of only 15°. Merely exceptional cases require greater buckling angles and it was found out that buckling angles never exceed 26°. The angle of 26° also corresponds, by the way, to the maximum buckling angle of a prior art joint.

It was found that the distance between the two vehicles or vehicle parts can also be reduced from originally 1,600 mm to less than 1,100 mm by virtue of this special construction of the joint. The length of the built-in bellows only amounts to about 800 mm. As a result thereof, another row of seats may be arranged in one of the vehicles or vehicle parts.

It is well known to provide the region of the joint with a connection that permits the passage from one vehicle to the other. The connection is comprised of an intercar gangway and of a bellows that surrounds both the gangway and the joint in the manner of a tunnel.

The advantages regarding design and durability of the bellows as they have been described for the first variant apply to these variants as well. More specifically, the bellows is shortened. By virtue of the buckling kinematics, the bellows is displaced in transverse direction but slightly, which positively influences its durability. As the bellows is only slightly displaced transversely, it may be made stiffer so that it bulges less, more particularly in downward direction.

Further advantageous features of the second and third embodiments will become apparent in the subordinate claims 11 through 24.

According to a particularly advantageous feature, the respective joint members for joint arms are arranged on a cradle that is movable across the central longitudinal axis of the vehicle. The cradle is thereby advantageously arranged on a bracket guiding device, in this case more specifically on a bracket guiding device provided with a round guiding facility, said bracket guiding device being connected to the one vehicle or vehicle part. The advantage of a such type bracket guiding device with a round guiding facility is that the cradle may be received by the bracket guiding device in such a manner that it may be pivoted vertically, the joint as a whole being, as a result thereof, capable of yielding to nodding movements as they occur for example when such type articulated vehicles travel through a depression or drive over a hilltop.

A bracket for the swivel joint is provided on the other vehicle or vehicle part, said swivel joint serving to receive the joint arms in such a manner that they are pivotal.

To attenuate the motion of rotation of the joint arms about the swivel joint, an attenuating device is provided. A such type attenuating device includes at least one attenuator that is connected on the one hand to the joint arm and on the other hand to the vehicle or vehicle part or the bracket. It is the function of such an attenuator, which is preferably realized as a double acting attenuator, to for example prevent the rear vehicle part when the vehicle of concern is a so-called pusher vehicle i.e., a vehicle in which the last rear axle is driven, from swerving to the side when the vehicle is traveling in a straight line. Furthermore, the bracket or the joint arm is advantageously configured in such a manner that the attenuator plunges into the bracket or the joint arm when the joint executes a pivoting movement, the whole buckling angle being thus available.

According to another feature of the invention, an attenuating member is advantageously provided between cradle and joint arm (second embodiment). Alternatively, an attenuating member may be arranged between the joint arms or, even better, between the cradles (third embodiment). Since, in arranging one respective attenuating member between cradle and joint arm, a total of two such attenuating members is required, the embodiment with one double-acting attenuating member located between the cradles or the joint arms respectively is less expensive. The primary function of said attenuating members or member is to allow the second stage of buckling to only happen when the swivel joint has reached the 15° limit of the buckling angle, which constitutes the first stage. Up to the buckling angle of 15°, the cradles are stopped in their position by the attenuating member or members respectively. Upon reaching the buckling angle of 15°, the attenuating member or members soften; as a result thereof and in function of the curve to be threaded, the respective one of the cradles moves on the bracket guiding device toward the other cradle. Although the attenuating member or members respectively develop a certain, though small attenuating effect at a buckling angle of more than 15° as well, the major part of the attenuation is performed by that attenuator that is active, which depends on the direction of the curve. This is the attenuator that is located on the outer side of the curve.

As already described herein above, the bracket guiding device may be realized as a round guiding facility so that the cradle, which is received by the round guiding facility, is vertically pivotal. In order to alternatively be capable of yielding to such nodding movements, the bracket on the other vehicle may be designed in such a manner that it is pivotal about a horizontal axle. In such a case, the bracket guiding device for the cradle could also be fixed in vertical direction. Bracket guiding device and bracket may also concurrently form the transverse beam of the vehicle's or the vehicle part's chassis, which permits to spare weight on the one hand and costs on the other.

In order to be capable of absorbing smaller swaying movements the cradle is advantageously provided with an elastic guide bush for receipt through the round guiding facility.

According to a second variant, a joint is provided between two vehicles or between two vehicle parts, of an articulated bus or a railcar for example, said joint being provided with a pivot bearing that connects the two vehicles or vehicle parts, said vehicles or vehicle parts slidably receiving said pivot bearing across the longitudinal axis of the vehicles or vehicle parts. In exactly the same manner than with the embodiments of the first variant, this construction permits to realize a short bellows with all of the advantages that have already been described with respect to the first variant and its embodiments. The important point in this variant is again that from a certain buckling angle, namely from a buckling angle of more than 15°, the pivot point is displaced across the central longitudinal axis i.e., toward the outer side of the vehicle or of the vehicle parts respectively. That is to say, up to a buckling angle of 15° the pivot bearing operates like a normal joint and does not change its position in the central longitudinal axis of the vehicle. Not before a buckling angle of more than 15° does said pivot bearing move toward the one or the other outer side of the vehicle, depending on the curve to be threaded.

In this connection there is more specifically provided that each vehicle or vehicle part be provided with a guidance for the pivot bearing. The guidance may hereby be configured as a bracket that extends across the central longitudinal axis, said pivot bearing being provided on either side with one cradle that is slidably received by the bracket.

In order to make certain that the pivot bearing is not displaced before a buckling angle of 15° is reached, the bracket is provided with an attenuating device that is connected to the pivot bearing. This clearly shows that the attenuating device is rigid up to a buckling angle of 15° so that the pivot bearing is fixed in its position in the central longitudinal axis of the vehicle, and only softens when the buckling angle exceeds 15° so that the pivot bearing moves outward on the bracket in an effort to provide the required higher buckling angle.

In order to make certain that a vehicle fitted with such a joint is capable of driving over hilltops and traveling through depressions, there is provided that at least one bracket be arranged on the vehicle or vehicle part in such a manner that it is pivotal about a horizontal axle.

To limit the buckling angle, a stop is provided between the brackets in spaced relationship from the central longitudinal axis, said stop advantageously providing guiding functions. This means that, by virtue of its construction and more specifically with regard to the design of the stop, said joint is also capable of absorbing swaying movements. To this purpose, the stop is more specifically comprised of two arms, each arm being arranged on a respective one of the brackets and both arms being configured in the shape of a fork and being slidable into one another. Accordingly, when a vehicle fitted with a such type joint is traveling in a straight line, the two arms of the stop are guided one into the other, the outer pair of arms losing contact with each other only when the vehicle travels round a curve while the other pair of arms, namely that pair of arms that is located on the inner side of the curve, is kept in contact and is capable of absorbing swaying movements.

The subject matter of the invention also is an articulated vehicle such as an articulated bus or a railcar for example, the various vehicle parts of which are linked together by means of a joint, said joint being characterized by one or several features of the two variants or of the embodiments described herein above.

The two variants of the invention with their embodiments will become apparent from the following detailed description of the invention and accompanying drawings.

DETAILED DESCRIPTION OF THE INVENTION

Figure 5:
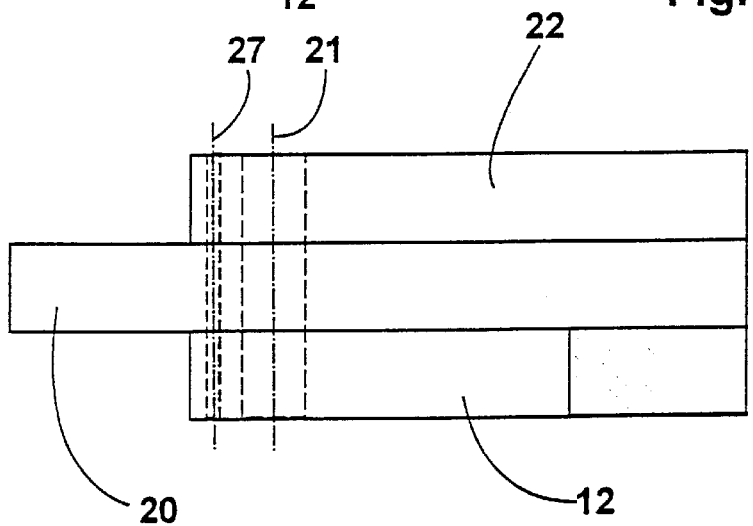
FIG. 5 is a section taken along the line VI—VI of FIG. 1.

As can be seen from FIGS. 1 through 5, the buckle joint of the first embodiment of the first variant, indicated generally at 1, is comprised of a first bearing bracket 10 and of a second bearing bracket 20. Bearing bracket 10 is rigidly arranged on the vehicle part 2, whereas bearing bracket 20 is connected to the other vehicle part 3 in such a manner that it is vertically movable, which is to say that it is connected thereto by horizontally oriented axle 4. By virtue of this type of connection the vehicle is capable of both traveling through depressions and driving over hilltops. The bearing bracket, which is generally referred to by reference numeral 10, is provided with a first joint member in the form of axle 11, to which the one joint arm 12 is pivotally arranged. The second bearing bracket 20 pivotally receives the second joint arm 22 by way of the second joint member in the form of axle 21, said axle 21 being connected not only to said joint arm 22 but also to joint arm 12. That is to say, the two joint arms 12 and 22 are joined together through bearing bracket 20. This furthermore clearly shows that the one bearing bracket is connected to two joint arms and that the other bearing bracket 20 is only connected to one joint arm. With respect to said bearing bracket 20, the two joint arms are hereby arranged above and beneath said bearing bracket 20 in an effort to minimize the structural height of the joint (FIG. 5).

Figure 1:
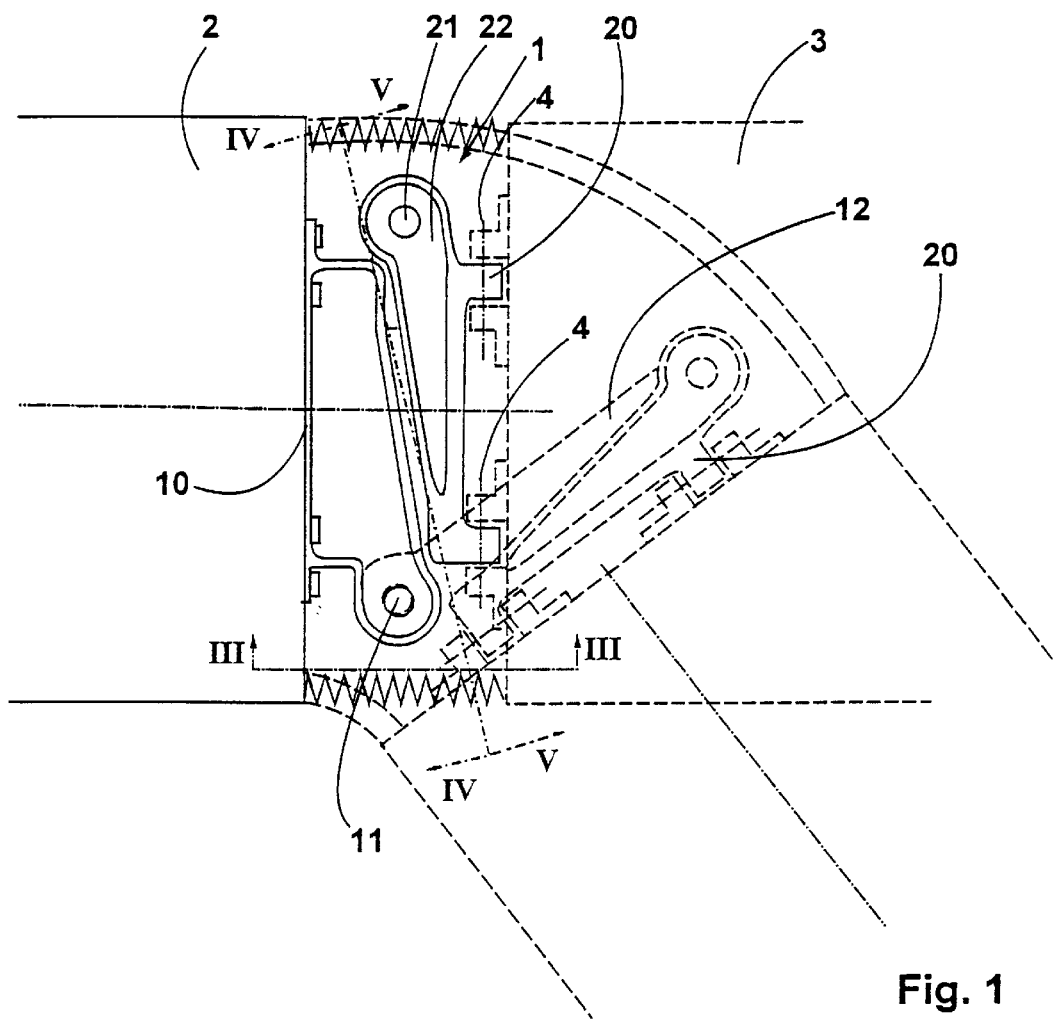
FIG. 1 is a top view of the buckle joint of a first embodiment of the first variant in a right-hand bend.
Figure 2:
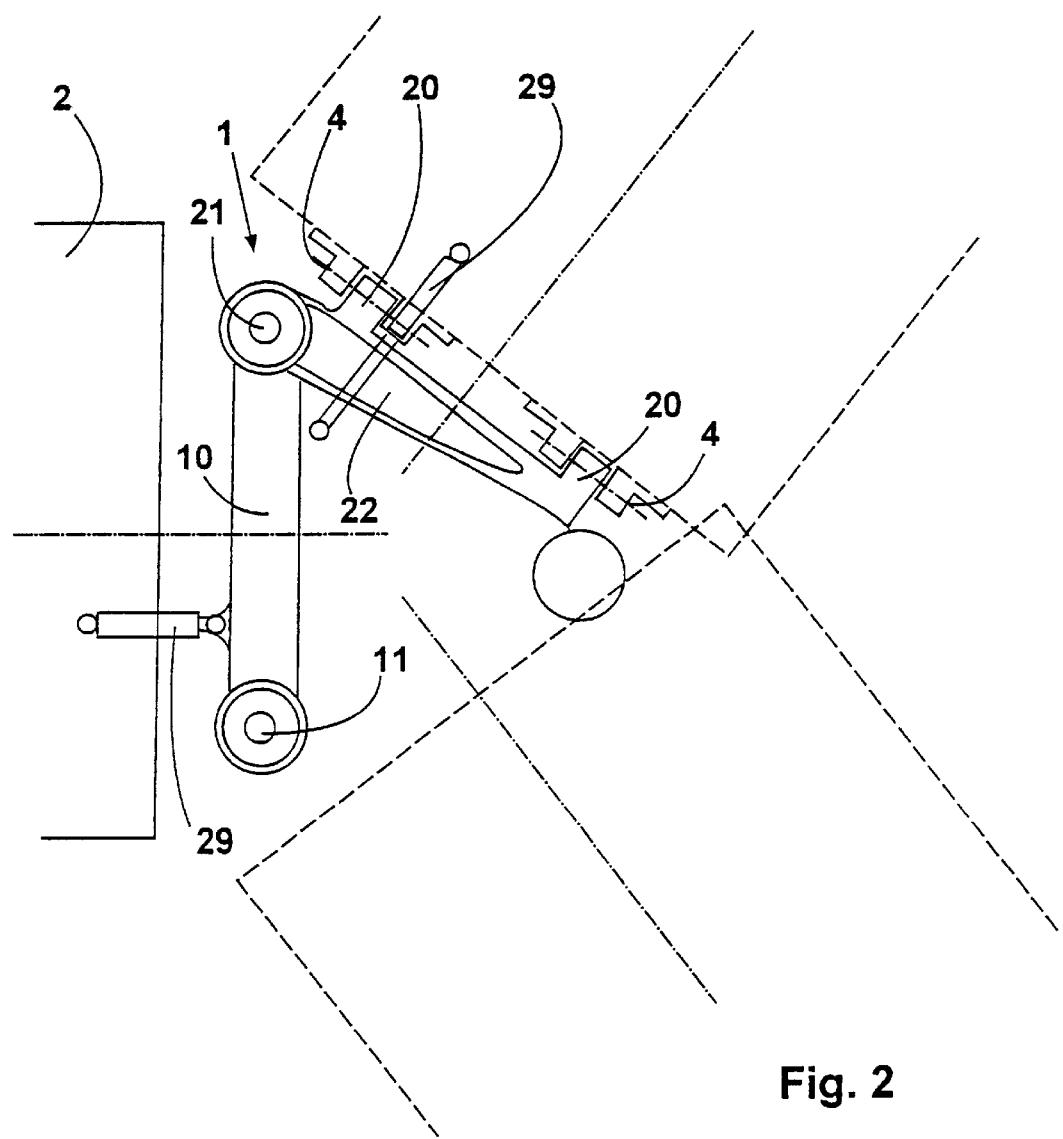
FIG. 2 shows the buckle joint according to the illustration of FIG. 1 in a left-hand bend.
Figure 3:
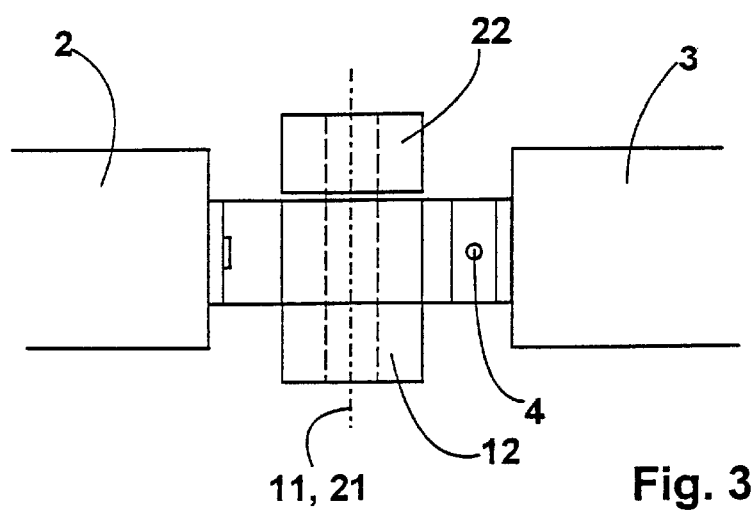
FIG. 3 is a section taken along the line III—III of FIG. 1.
Figure 4:
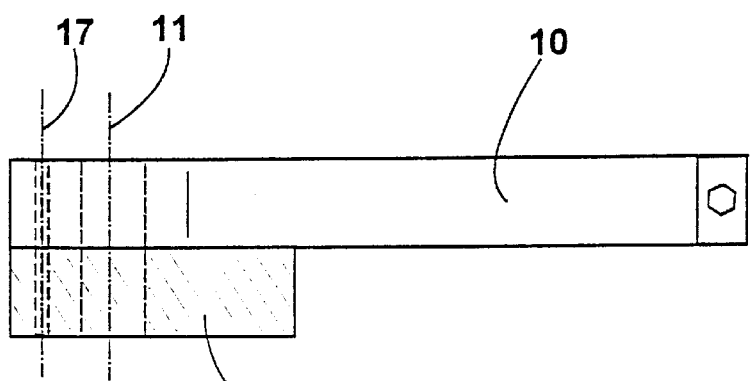
FIG. 4 is a section taken along the line IV—IV of FIG. 1.

To prevent the joint from stretching when the vehicle is traveling in a straight line, the two joint arms 12, 22 are secured against rotation about their respective axles 11, 21. Bolts 17 and 27 (FIG. 4 and FIG. 5) hereby non-rotatably link bearing bracket and joint arm or bearing bracket and the two joint arms 12, 22. When, as shown in FIG. 1 for example, the vehicle is traveling around a curve, joint arm 12 is free to rotate about axle 11, while joint arm 22 is fixed about axle 21. In a left-hand bend however, as shown in FIG. 2, bearing bracket 10 is rigidly coupled to joint arm 12. In this case, bolt 27 does not mesh with bearing bracket 20. Another variant for locking the joint arms is schematically shown in FIG. 2; this Fig. illustrates active or passive hydraulic members 29 that secure the various joint arms 12, 22 against rotation by blocking the flow of oil, the principle of which has already been described herein above.

Figure 6:
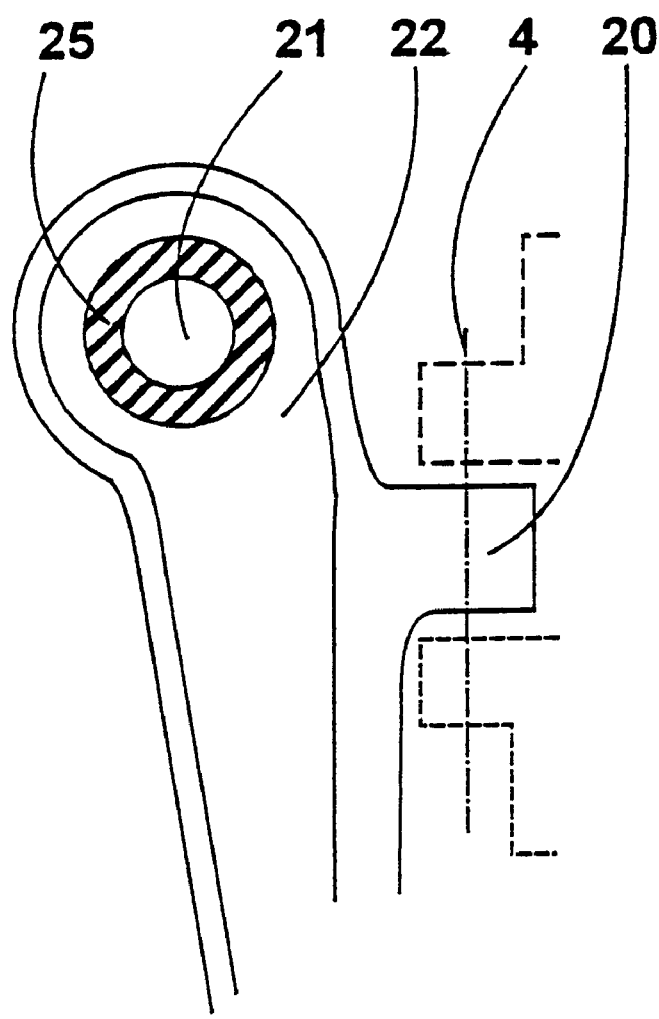
FIG. 6 shows how the axle is carried in a sleeve made from a resilient material.

FIG. 6 shows how the pivot is carried in a sleeve 25 made from a resilient material. The nodding and swaying movements occurring during the ride may be intercepted in accordingly dimensioning the sleeve and in accordingly selecting the material. In such a case, the bearing bracket 20 might be realized as a rigid connection between buckle joint and vehicle.

Figure 13:
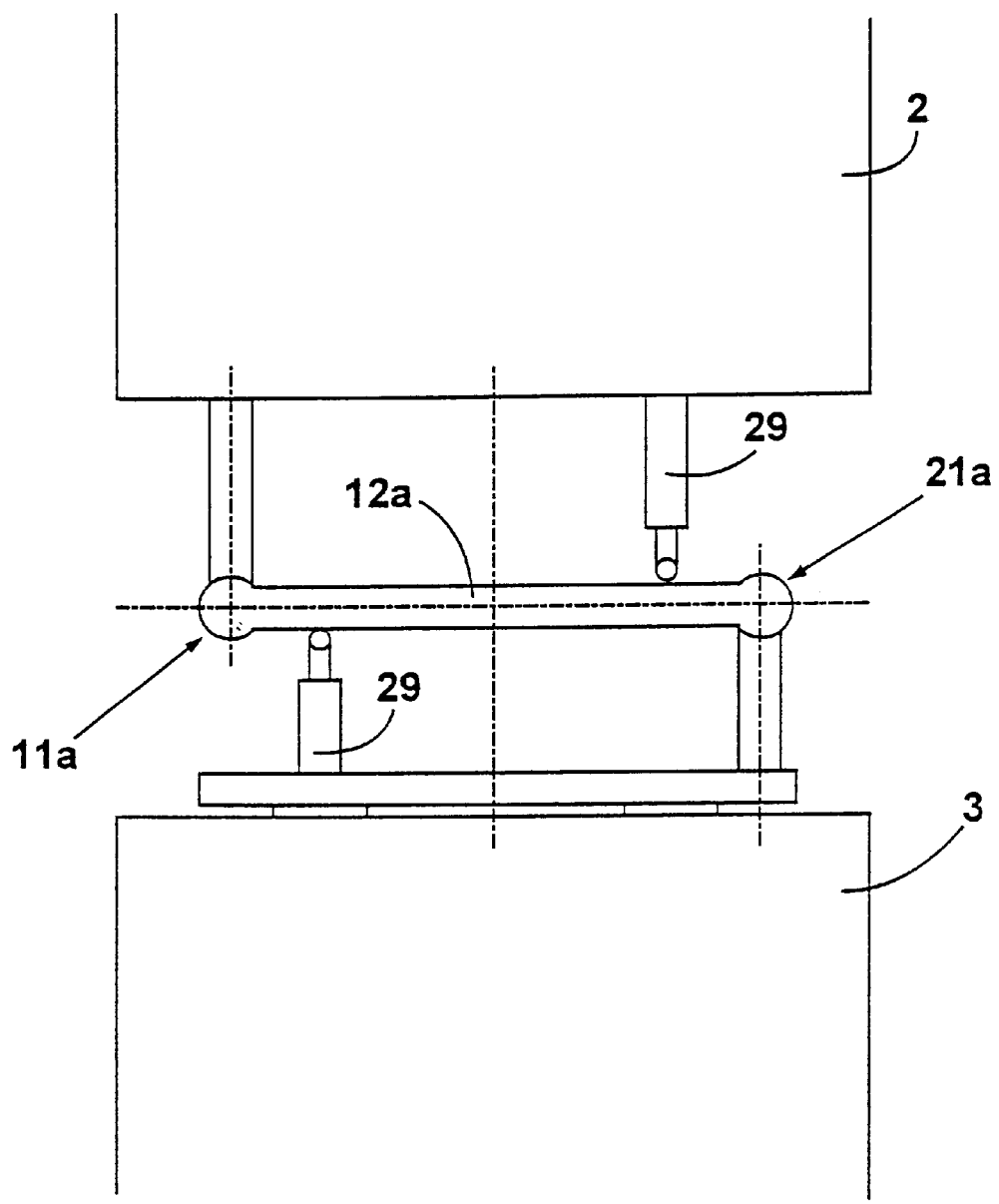
FIG. 13 shows the buckle joint of the first embodiment with two joint members but with only one joint arm.
Figure 14:
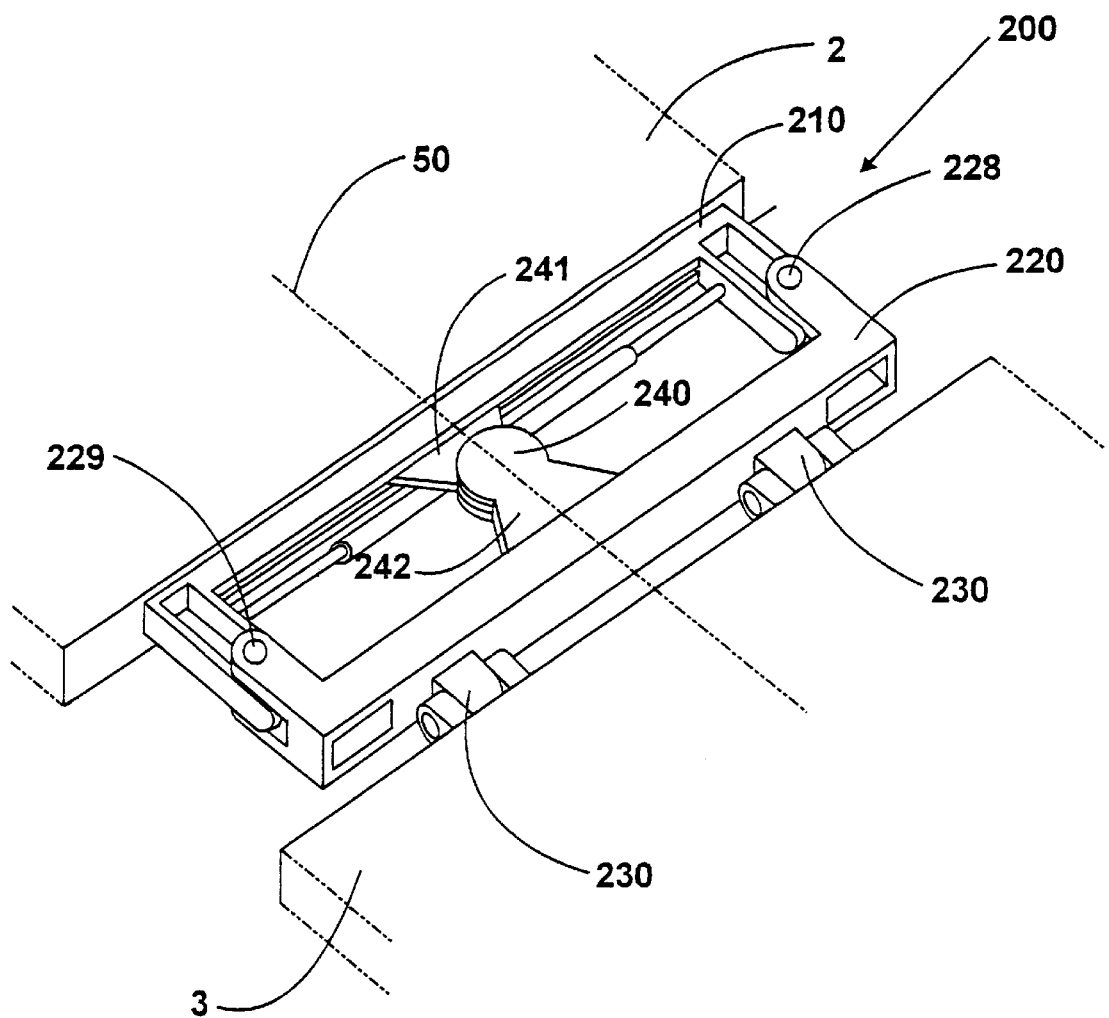
FIG. 14 shows a second variant of a joint, when the vehicle is traveling in a straight line.

The embodiment according to FIG. 13 of the first variant shows a joint arm 12a and the two joint members 11a, 21a. Joint arm 12a may hereby be pivoted alternatively about the one joint member 11a or about the other joint member 21, depending on the curve. It works in a way similar to that of a swinging door with two joints. Active or passive hydraulic members 29 make certain that a respective one of the joint members only is active while threading a curve. When the vehicle travels in a straight line, the two hydraulic members 29 are locked so that the joint does not stretch.

The joint generally indicated at 100 of the second embodiment of the first variant is located between the front coach 102 and the rear coach 103, both shown in schematic form. The bracket guiding device 110, which slidably receives the two cradles 111 and 112 across the longitudinal axis 50, is linked to front coach 103. The two joint arms 113 and 114 are linked to the cradles 111 and 112 by means of the joint members 111a and 112a that are designed as oscillating joints. Oscillating joint 111a and 112a more specifically comprises a vertically oriented axle about which are arranged the joint arms 113 and 114 in such a manner as to be rotatably or pivotally movable. At their other end, the joint arms 113 and 114 are joined together by way of swivel joint 120. Said swivel joint 120 is a component part of bracket 130 which in turn is arranged on the front coach 102. Bracket 130 is linked to front coach 102 by way of the joint bearings 135, 136 that are each provided with a horizontally oriented axle that receives bracket 130 in such a manner that it is vertically movable, the vehicle being thus capable of traveling through depressions or of driving over hilltops. Said pivot bearing 135, 136 is configured as a metallic rubber bearing so that the connection between the two vehicles is resilient to a certain extent.

There is furthermore provided an attenuating device 140 with the two attenuators 141, each of these attenuators being connected to joint arm 113, 114 on the one hand and to bracket 130 on the other hand. These attenuators 141 are configured as double acting hydraulic cylinders and finally serve to stabilize and stiffen the joint.

Attenuating members 160 in the form of hydraulic cylinders are furthermore provided, said attenuating members being arranged between cradle 111, 112 on the one hand and joint arm 113, 114 on the other hand. The main function of the attenuating members 160 is to keep the cradles 111, 112 in their outer end position i.e., to prevent them from moving toward each other, up to a buckling angle of 15°. Only after the whole buckling angle of 15° has been utilized by pivoting the joint arms about swivel joint 120, will the attenuating members 160 become so resilient that the respective one of the cradles moves toward the central longitudinal axis 50 i.e., in the direction of the other cradle, in accordance with the curve to be threaded. The corresponding attenuating member 160 hereby effects a certain small attenuation, although the main attenuation is carried out by the respective one of the attenuators 141 in accordance with the curve that is threaded.

Figure 7:
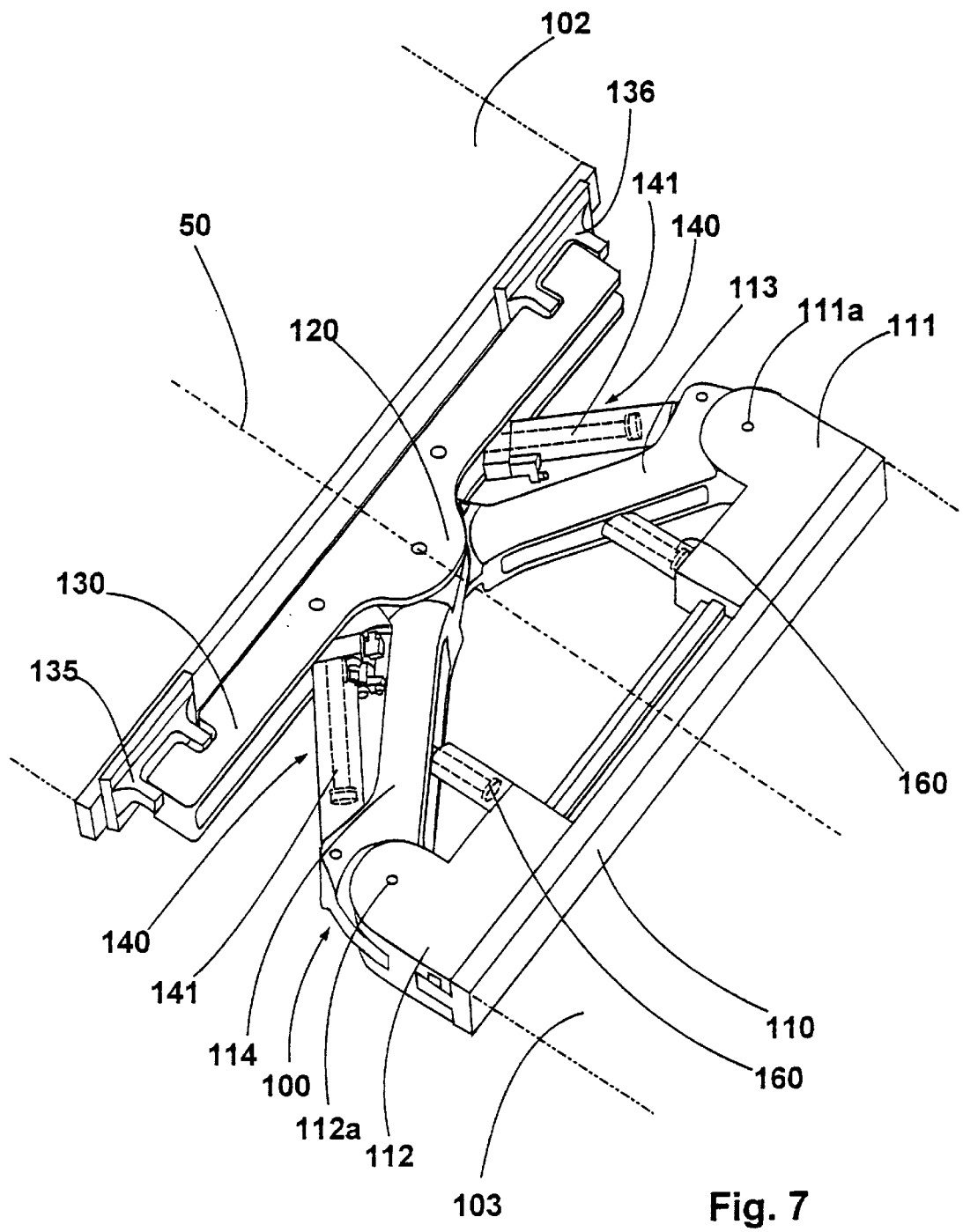
FIG. 7 shows a second embodiment of the first variant of the joint in accordance with the invention when the articulated vehicle is traveling in a straight line.
Figure 8:
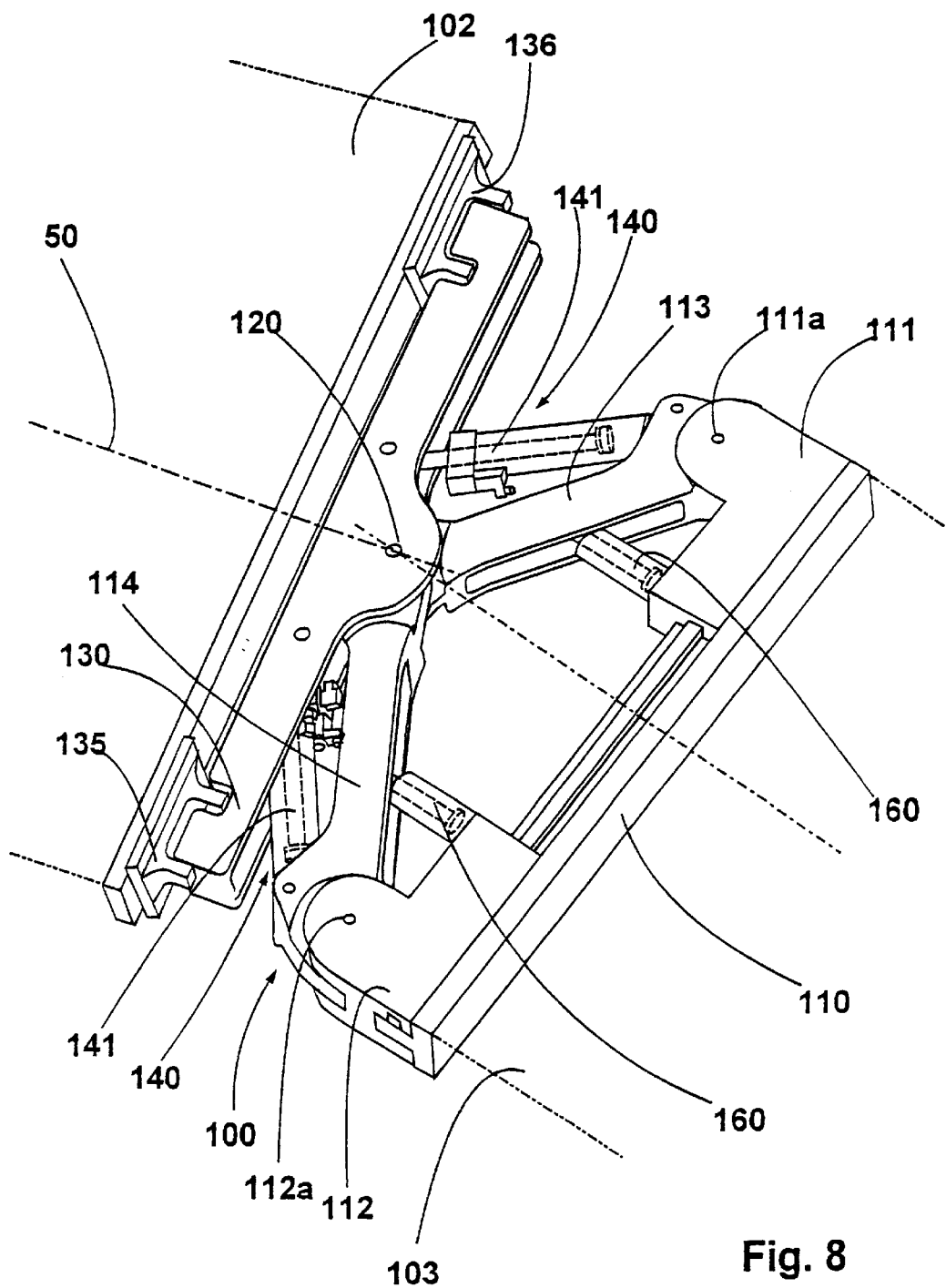
FIG. 8 shows the joint of FIG. 7 at a steering angle of 15°.
Figure 9:
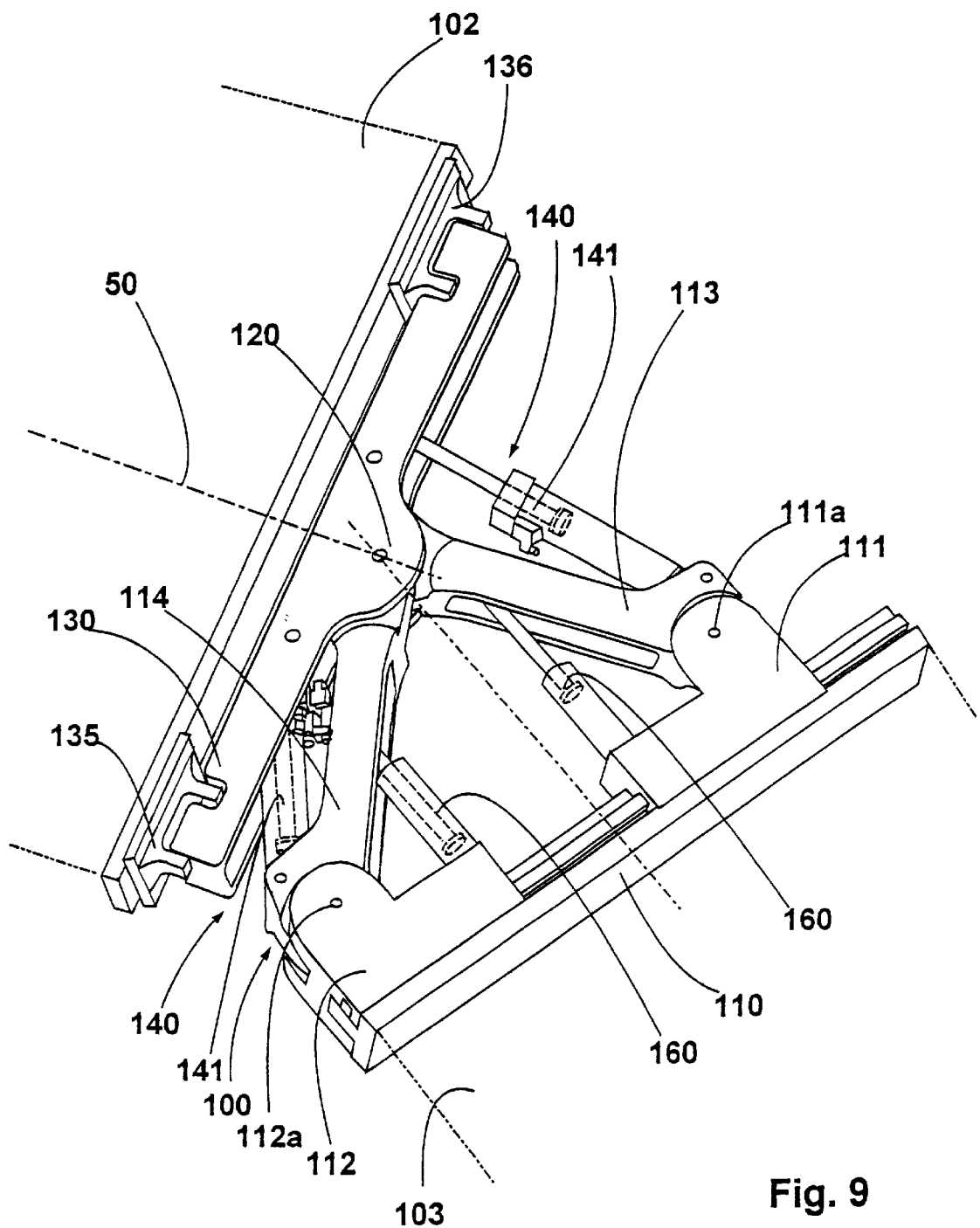
FIG. 9 shows the joint of FIG. 7 at a steering angle of 15° and additionally at an oscillating angle of 11°.

In the embodiment according to the FIGS. 7 through 9, the bracket guiding device 110 is configured as a purely horizontal guidance for the cradles 111 and 112. It is therefore necessary, as has already been explained herein above, that the pivot bearings 135, 136 permit vertical movement.

Figure 10:
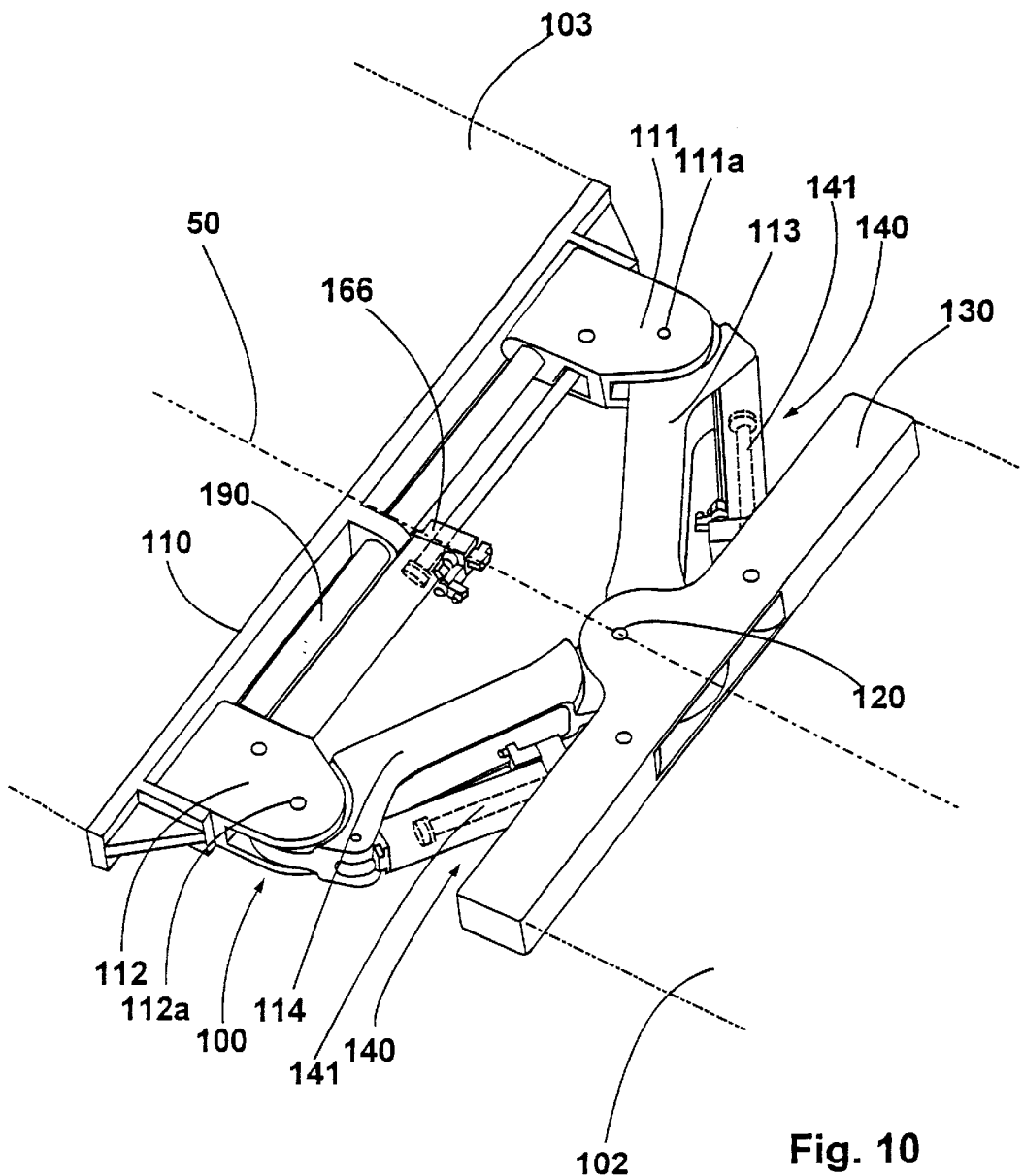
FIG. 10 shows a third embodiment of the first variant of a joint when the articulated vehicle is traveling in a straight line.
Figure 11:
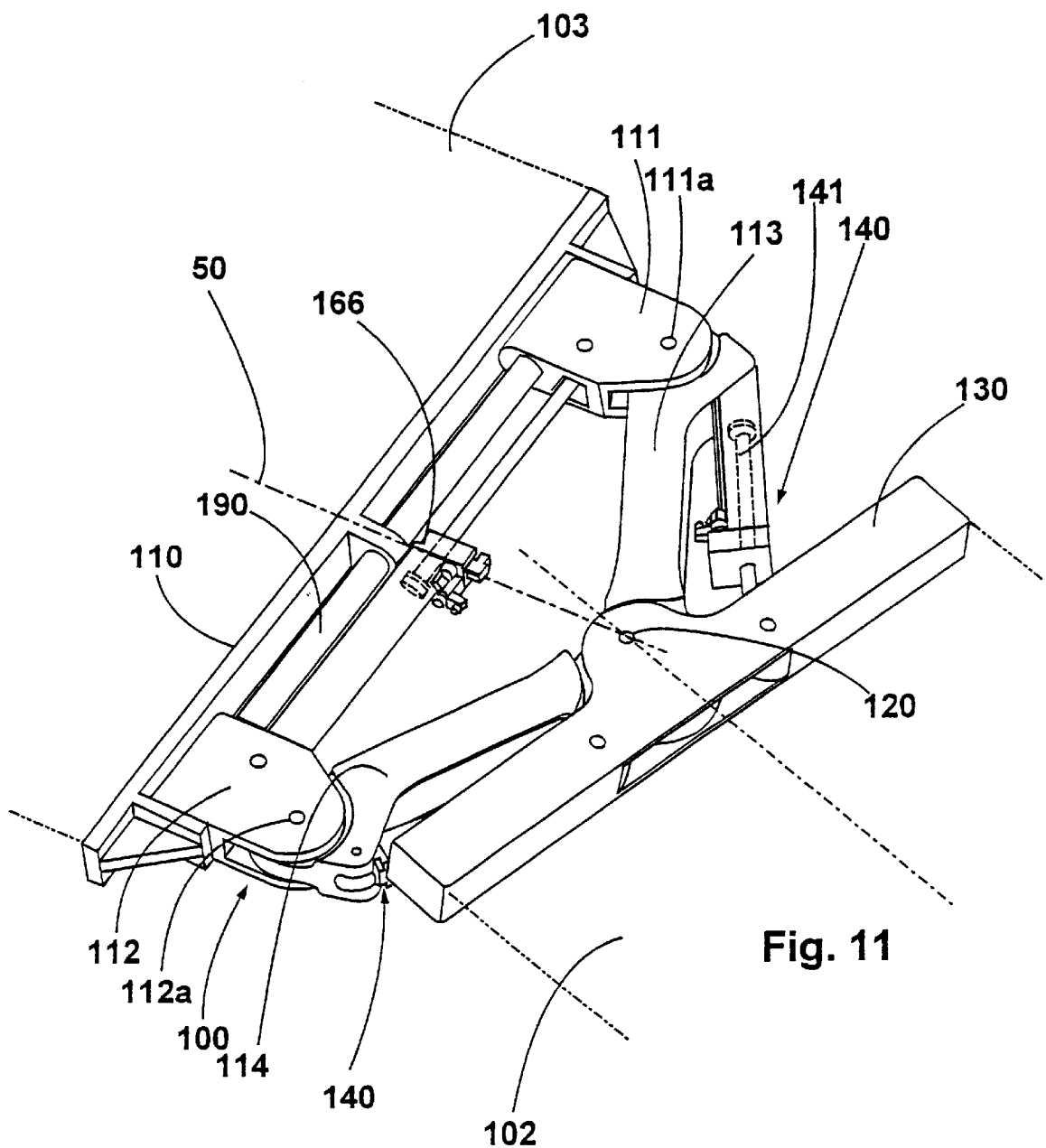
FIG. 11 shows the joint of FIG. 10 at a steering angle of 15°.
Figure 12:
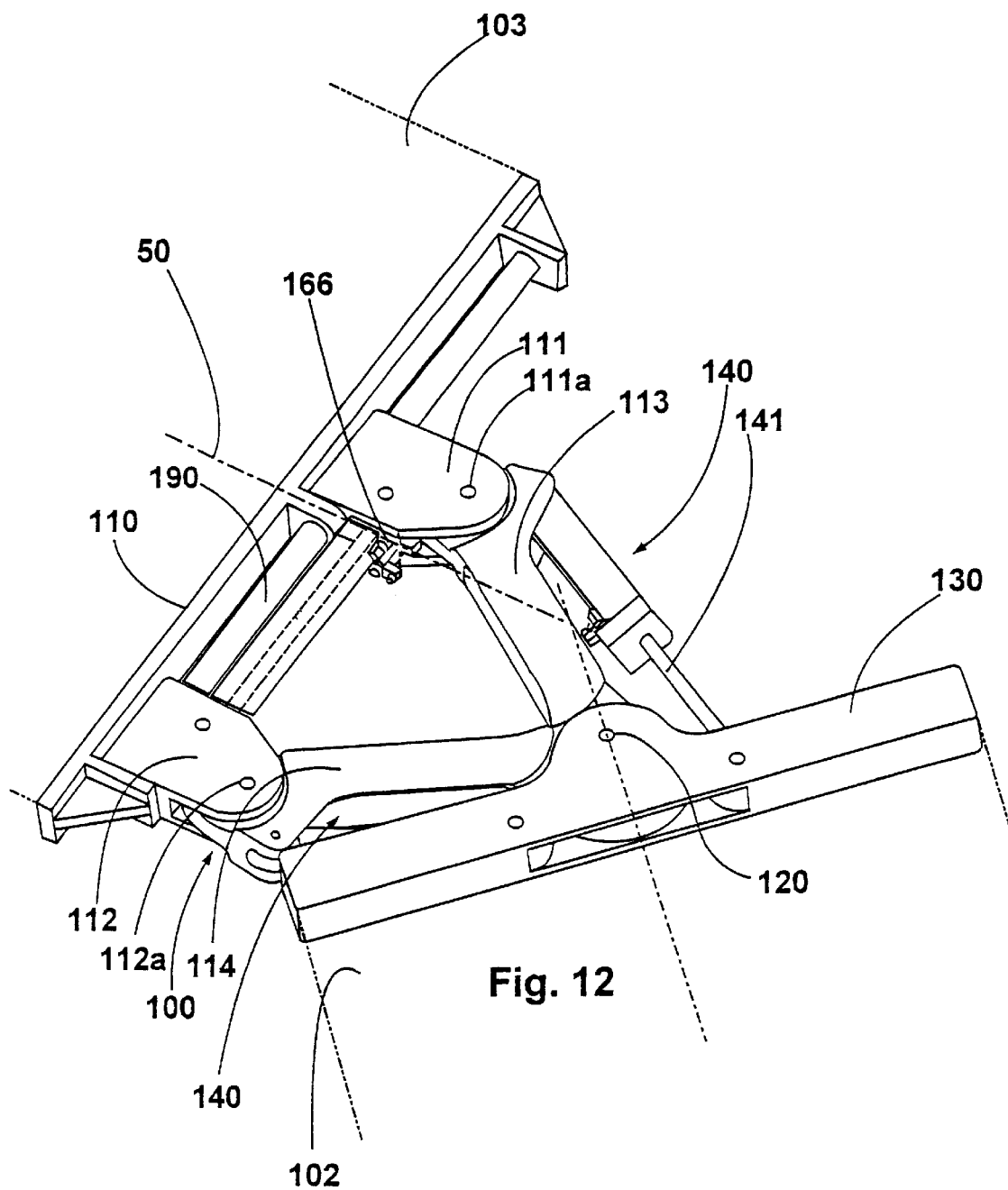
FIG. 12 shows the joint of FIG. 10 at a steering angle of 15° and at an oscillating angle of 11°.

The third embodiment of the first variant of the joint according to the FIGS. 10 through 12 among others differs from the second embodiment of the joint according to the FIGS. 7 through 9 in that the bracket guiding device 110 is provided with a round guiding facility for the cradles 111, 112 so that bracket 130 may be arranged directly on front coach 103 i.e., without using pivot bearings 135, 136. Furthermore, in this embodiment, one attenuating member 166 is provided instead of the two attenuating members 160, said attenuating member 166 being directly arranged between the two cradles 111, 112. The function of this attenuating member 166 is the same as that of the attenuating members 160 in the embodiment according to the FIGS. 7 through 9. In the two embodiments, like elements bear the same reference numerals.

The second variant is described in the FIGS. 13 through 17.

The joint, which is indicated generally at 200, is arranged between the vehicle parts 2 and 3. Said joint 200 has two brackets 210, 220, bracket 220 being arranged on the vehicle part 3 in such a manner that it is vertically pivotal about a horizontal axle 230 in an effort to make certain that the vehicle is capable of both driving over hilltops and traveling through depressions. The two brackets 210, 220 receive the pivot bearing generally referred to by reference numeral 240. On either side pivot bearing 240 has one respective cradle 241 and 242, said cradles 241 and 242 being carried in the C-shaped profile of bracket 210, 220. Tensile and braking forces between the vehicles are transmitted by way of this pivot bearing.

The attenuating device 250 has a piston rod 251 and a cylinder 252, cylinder 252 being fastened to cradle 242. Attenuating device 250 may hereby be configured as an active or passive hydraulic attenuator. Piston rod 251 of said attenuating device 250 is arranged on the end side of bracket 210, as can be surveyed from FIG. 16 for example. The arms 226, 227 have the shape of a fork, a bolt 228, 229 that joins the two fork elements and engages the matching fork-shaped arms 216 being provided on the front side. When traveling in a straight line (FIG. 14), the arms 216, 217 and 226, 227 respectively, which are arranged on the brackets to either side of the central longitudinal axis 50 of the vehicle, are joined together so that swaying movements that occur in this position between the two vehicles may be absorbed by the two arm connections. The pairs of arms hereby also serve as a stop for limiting the buckling angle.

Figure 15:
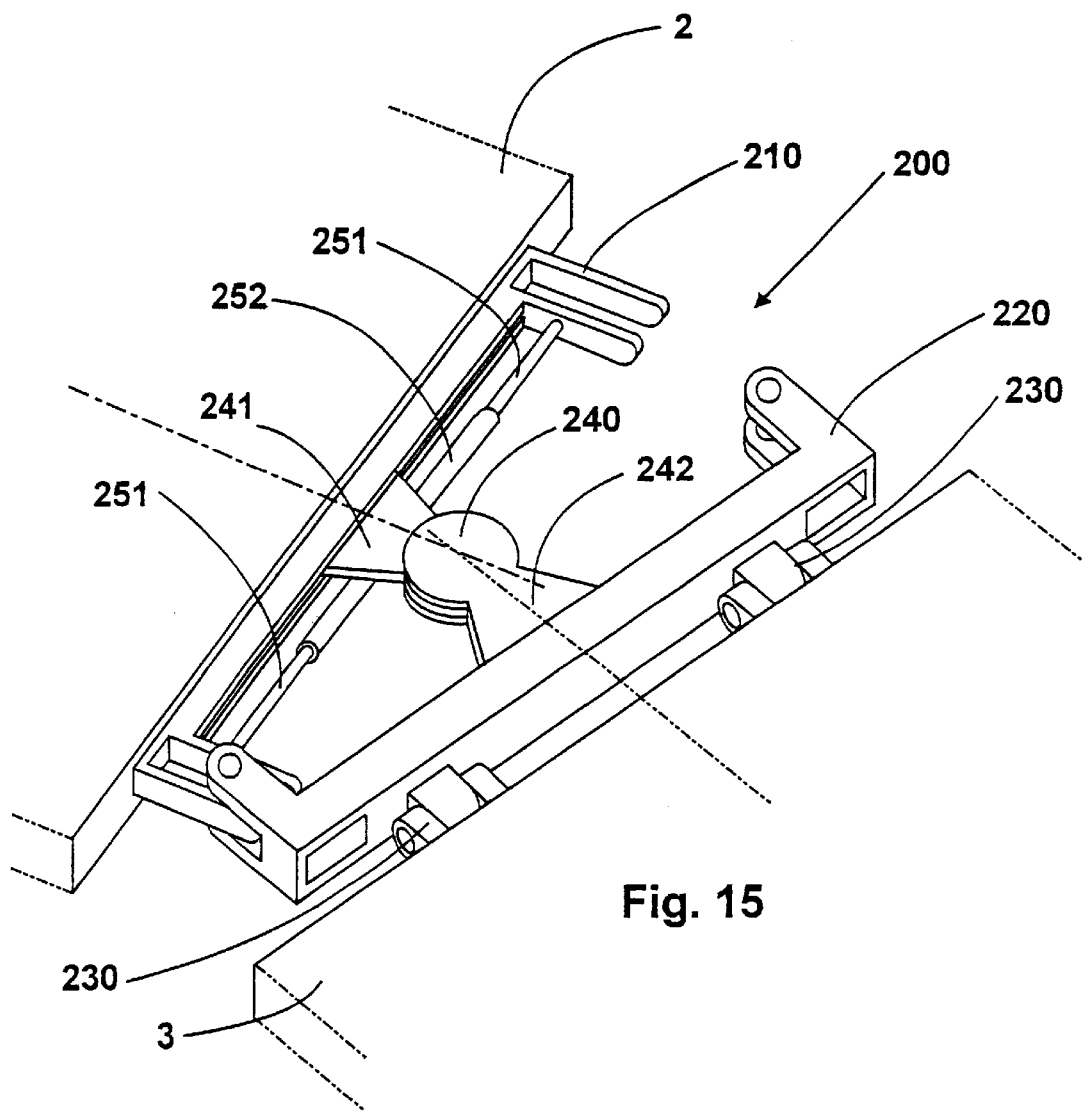
FIG. 15 shows the second variant of FIG. 14 at a buckling angle of 15°.
Figure 16:
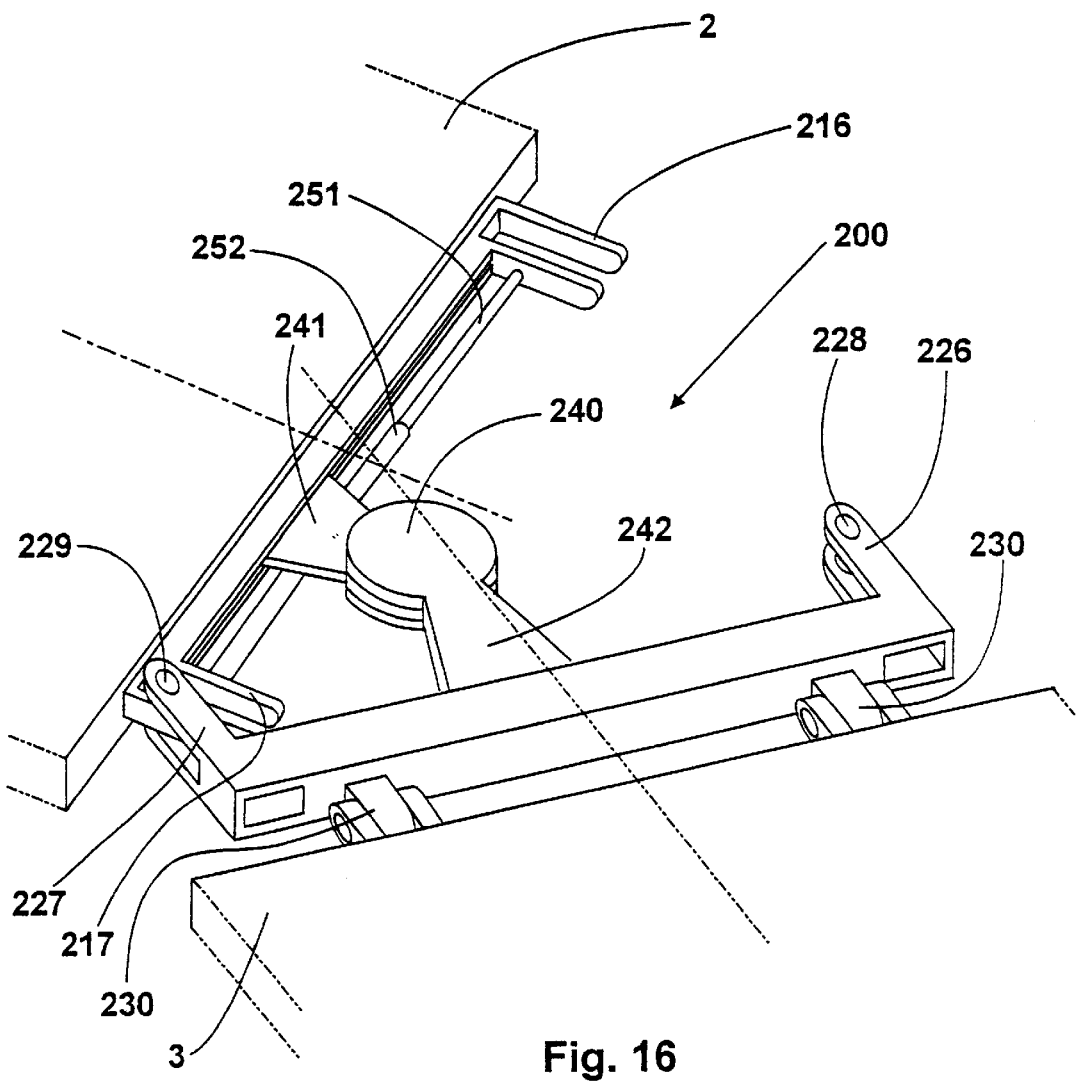
FIG. 16 shows the second variant at a buckling angle of 26°.
Figure 17:
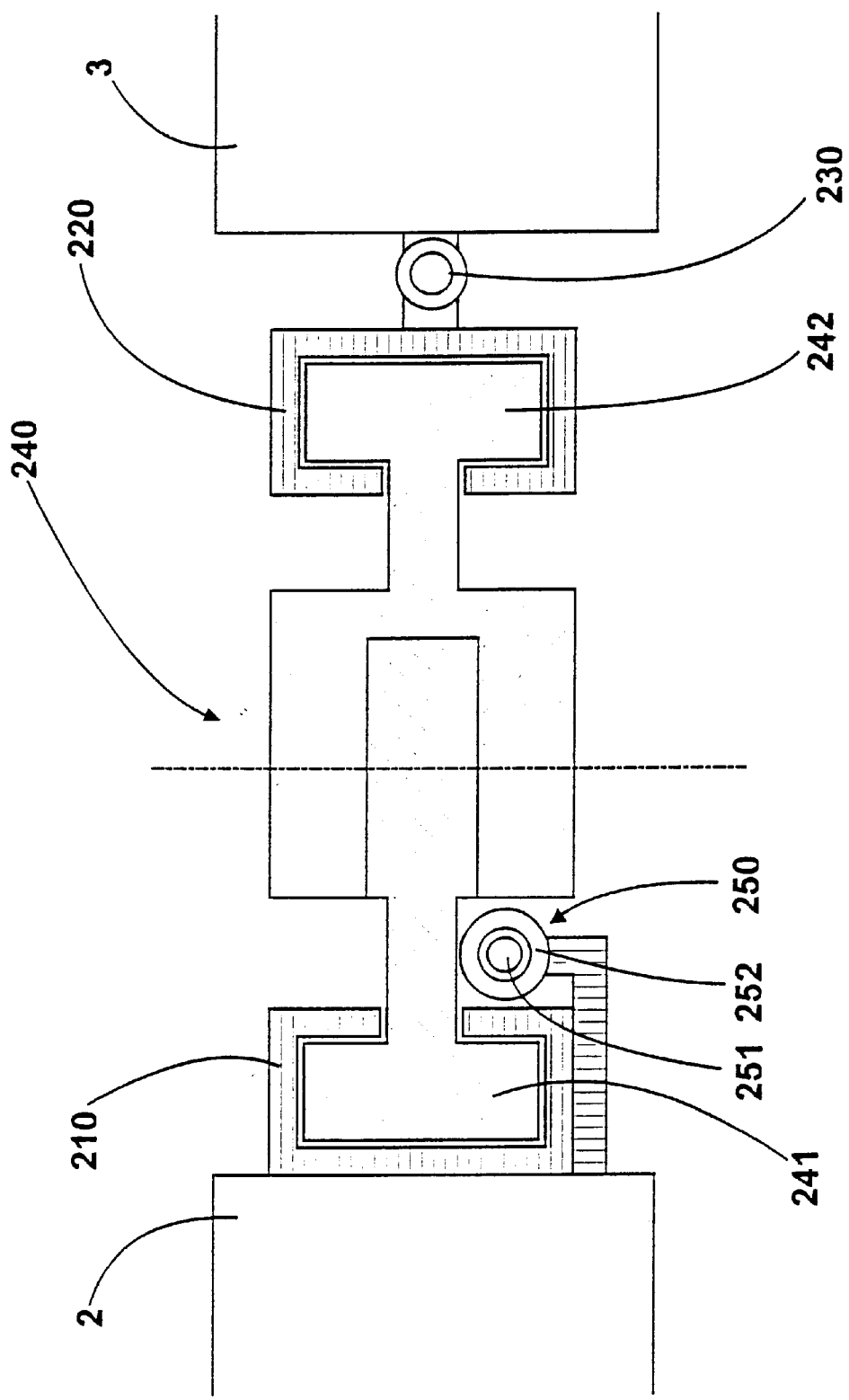
FIG. 17 is a section taken along the line XVI—XVI of FIG. 16.

In the position according to FIG. 15 and at an angle of approximately 15°, the arms 227, 217 that are located on the inner side of the curve constitute the stop described above when the arms have reached their end position in gliding inside one another. If an angle of more than 15° is required (FIG. 16), the pivot bearing 240 moves in the brackets toward the inner side of the curve. In this case, the attenuating device 250 is soft, thus permitting the pivot bearing 240 to execute such a displacement. The attenuating device is hard up to a buckling angle of 15° in order to make certain that the pivot bearing remains in its position in the central longitudinal axis 50 of the vehicle.

We claim:

1. A joint between two vehicles, said joint (100) comprising at least two joint members (111a, 112a) that are held apart from a central longitudinal axis (50) of the vehicle (102, 103) by at least one of one or two joint arms (113, 114) that are capable of rotating about the two joint members (111a, 112a), characterized in that the joint members (111a, 112a) are slidably received by one of the vehicles across the central longitudinal axis (50) thereof, the two joint arms (113, 114) being connected to the other one of the vehicles by means of a pivot or swivel joint (120) that is arranged in the central longitudinal axis (50) of the vehicle.

2. The joint according to claim 1, characterized in that the respective joint members (111a, 112a) for joint arms (113, 114) are arranged on a cradle (111, 112) that is movable across the central longitidunal axis (50) of one of the vehicles (102, 103).

3. The joint according to claim 2, characterized in that an attenuating member (160) is provided between the cradle (111, 112) and the joint arm (113, 114).

4. An articulated vehicle in the form of one of an articulated bus or railcar in which various vehicle parts are linked together by a joint, characterized in that the joint (100) is designed according to claim 3.

5. The joint according to claim 2, characterized in that an attenuating member (166) is arranged between the two joint arms (113, 114).

6. An articulated vehicle in the form of one of an articulated bus or railcar in which various vehicle parts are linked together by a joint, characterized in that the joint (100) is designed according to claim 5.

7. The joint according to claim 2, characterized in that an attenuating member (166) is arranged between two cradles (111, 112).

8. An articulated vehicle in the form of one of an articulated bus or railcar in which various vehicle parts are linked together by a joint, characterized in that the joint (100) is designed according to claim 7.

9. The joint according to claim 2, characterized in that the joint arms (113, 114) are arranged on the cradle (111, 112) in such a manner that they are angularly inclined toward the pivot or swivel joint (120).

10. An articulated vehicle in the form of one of an articulated bus or railcar in which various vehicle parts are linked together by a joint, characterized in that the joint (100) is designed according to claim 9.

11. An articulated vehicle in the form of one of an articulated bus or railcar in which various vehicle parts are linked together by a joint, characterized in that the joint (100) is designed according to claim 2.

12. The joint according to claim 1, characterized in that a cradle (111, 112) is arranged on a bracket guiding device (110) that is connected to one of the vehicles (102, 103).

13. The joint according to claim 12, characterized in that the bracket guiding device (110) is provided with a round guiding facility (190), the cradle (111, 112) being received by the round guiding facility (190) in such a manner that it is vertically pivotable.

14. The joint according to claim 13, characterized in that the cradle (111, 112) is provided with an elastic guide bush for receipt through the round guiding facility (190).

15. An articulated vehicle in the form of one of an articulated bus or railcar in which various vehicle parts are linked together by a joint, characterized in that the joint (100) is designed according to claim 14.

16. An articulated vehicle in the form of one of an articulated bus or railcar in which various vehicle parts are linked together by a joint, characterized in that the joint (100) is designed according to claim 12.

17. An articulated vehicle in the form of one of an articulated bus or railcar in which various vehicle parts are linked together by a joint, characterized in that the joint (100) is designed according to claim 13.

18. The joint according to claim 1, characterized in that a bracket (130) for the pivot or swivel joint (120) is arranged on the other vehicle (102).

19. The joint according to claim 18, characterized in that the bracket (130) is linked to one of the vehicles (102) in such a manner that it is pivotable about a horizontal axle (135, 136).

20. An articulated vehicle in the form of one of an articulated bus or railcar in which various vehicle parts are linked together by a joint, characterized in that the joint (100) is designed according to claim 19.

21. The joint according to claim 18, characterized in that the bracket (130) or the bracket guiding device (110) is a transverse beam of one of the vehicle's (102, 103) frame.

22. An articulated vehicle in the form of one of an articulated bus or railcar in which various vehicle parts are linked together by a joint, characterized in that the joint (100) is designed according to claim 21.

23. An articulated vehicle in the form of one of an articulated bus or railcar in which various vehicle parts are linked together by a joint, characterized in that the joint (100) is designed according to claim 18.

24. The joint according to claim 1, characterized in that an attenuating device (140) is provided to attenuate any oscillating movement of the joint arms (113, 114) about the joint members (111*a*, 112*a*).

25. The joint according to claim 24, characterized in that the attenuating device (140) comprises at least one attenuator (141) that is connected to the joint arm (113, 114) on the one hand and to one of the vehicle (102) or a bracket (130) for the pivot or swivel joint (130) on the other hand.

26. An articulated vehicle in the form of one of an articulated bus or railcar in which various vehicle parts are linked together by a joint, characterized in that the joint (100) is designed according to claim 25.

27. The joint according to claim 25, characterized in that the bracket (130) is configured in such a manner than, when the joint (100) is pivoting, the attenuator (141) plunges into the bracket (130) or into the joint arm (113, 114).

28. An articulated vehicle in the form of one of an articulated bus or railcar in which various vehicle parts are linked together by a joint, characterized in that the joint (100) is designed according to claim 24.

29. An articulated vehicle in the form of one of an articulated bus or railcar in which various vehicle parts are linked together by a joint, characterized in that the joint (100) is designed according to claim 1.

* * * * *